Oct. 22, 1940.   C. H. KIDWELL ET AL   2,219,011
APPARATUS FOR GRINDING
Original Filed June 20, 1936   6 Sheets-Sheet 1
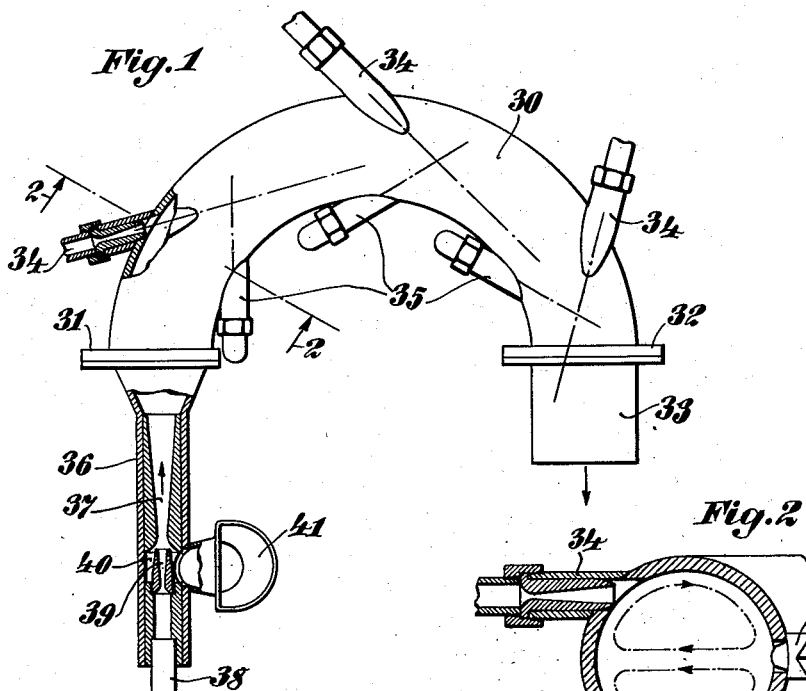
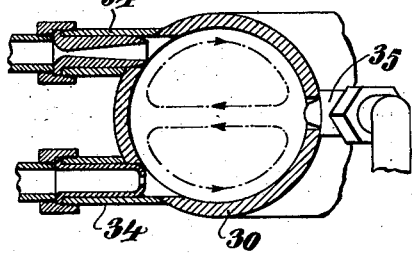
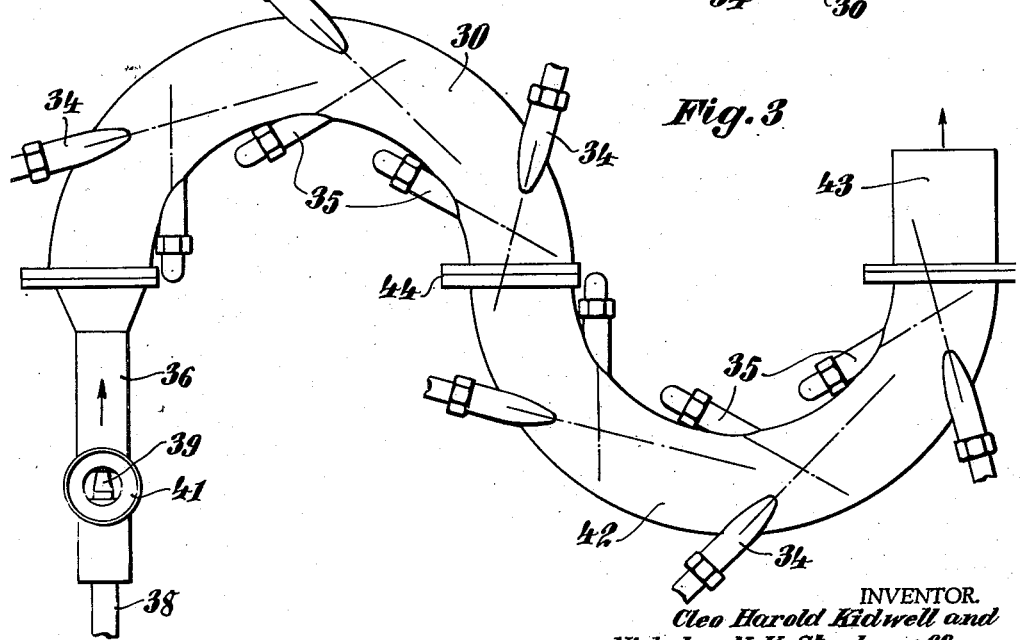
INVENTOR.
*Cleo Harold Kidwell and*
BY *Nicholas N. K. Stephanoff,*
*Hoguet, Neary + Campbell,*
*Their* ATTORNEYS Oct. 22, 1940.  C. H. KIDWELL ET AL  2,219,011
APPARATUS FOR GRINDING
Original Filed June 20, 1936   6 Sheets-Sheet 2
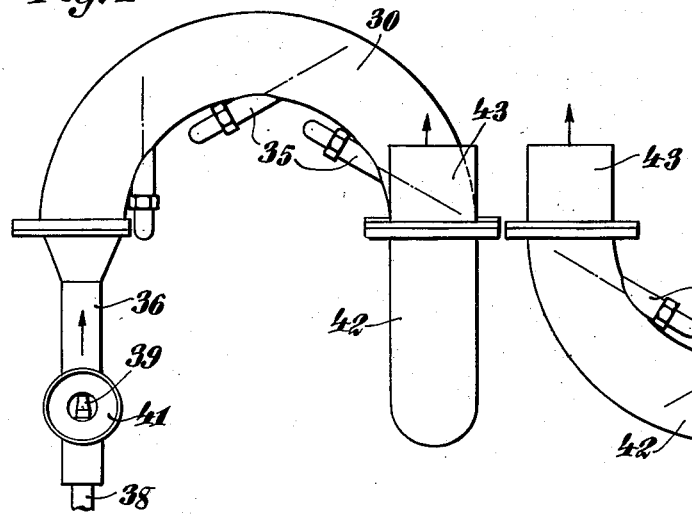
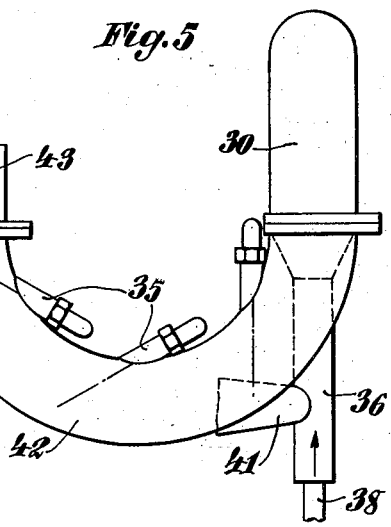
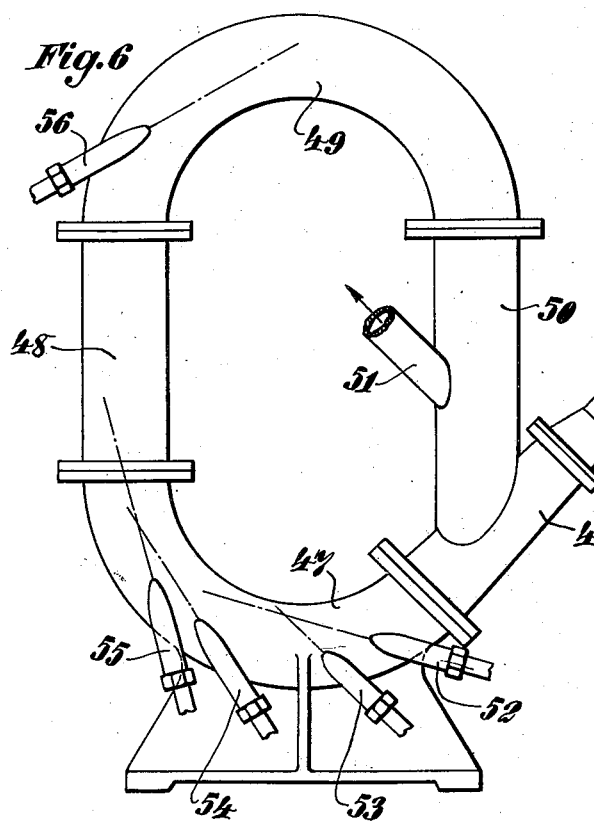
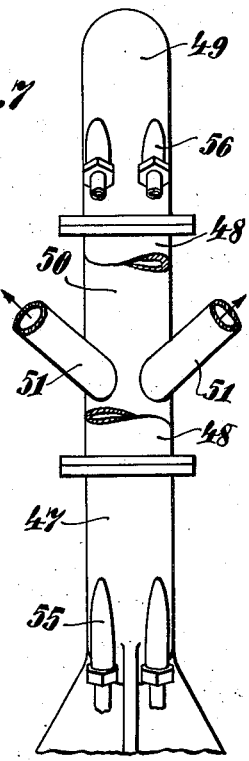
INVENTOR.
Cleo Harold Kidwell and
Nicholas N. K. Stephanoff,
BY Hoguet, Neary & Campbell
Their ATTORNEYS Oct. 22, 1940.  C. H. KIDWELL ET AL  2,219,011
APPARATUS FOR GRINDING
Original Filed June 20, 1936   6 Sheets-Sheet 3
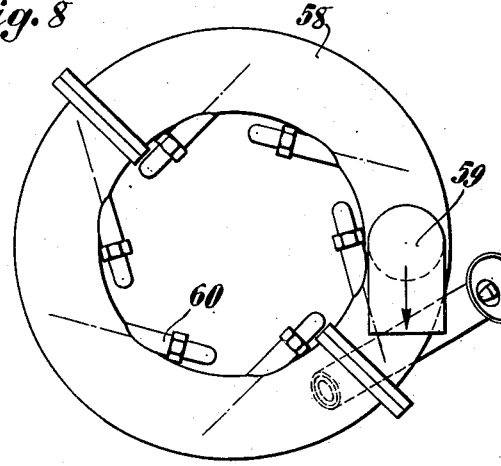
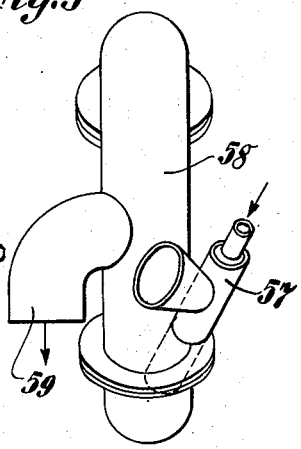
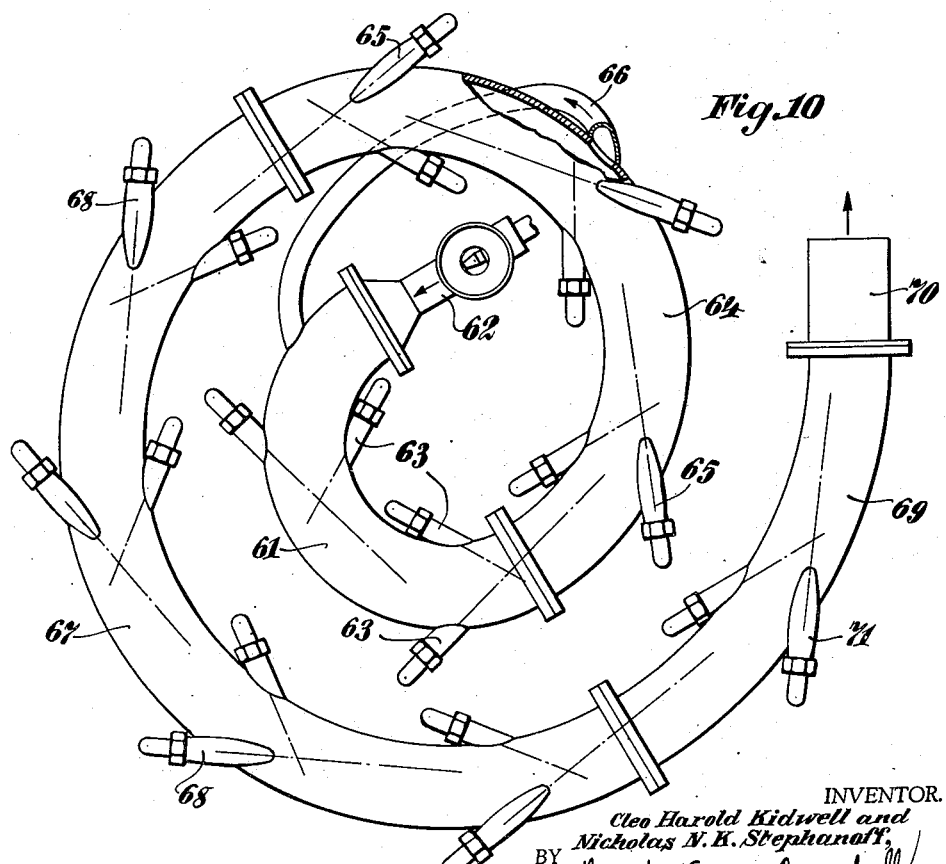
INVENTOR.
Cleo Harold Kidwell and
Nicholas N. K. Stephanoff,
BY Hoguet, Neary & Campbell,
Their ATTORNEYS Oct. 22, 1940.    C. H. KIDWELL ET AL    2,219,011
APPARATUS FOR GRINDING
Original Filed June 20, 1936    6 Sheets-Sheet 5

INVENTOR.
Cleo Harold Kidwell and
Nicholas N. K. Stephanoff,
BY
Hognet, Neary & Campbell
ATTORNEYS

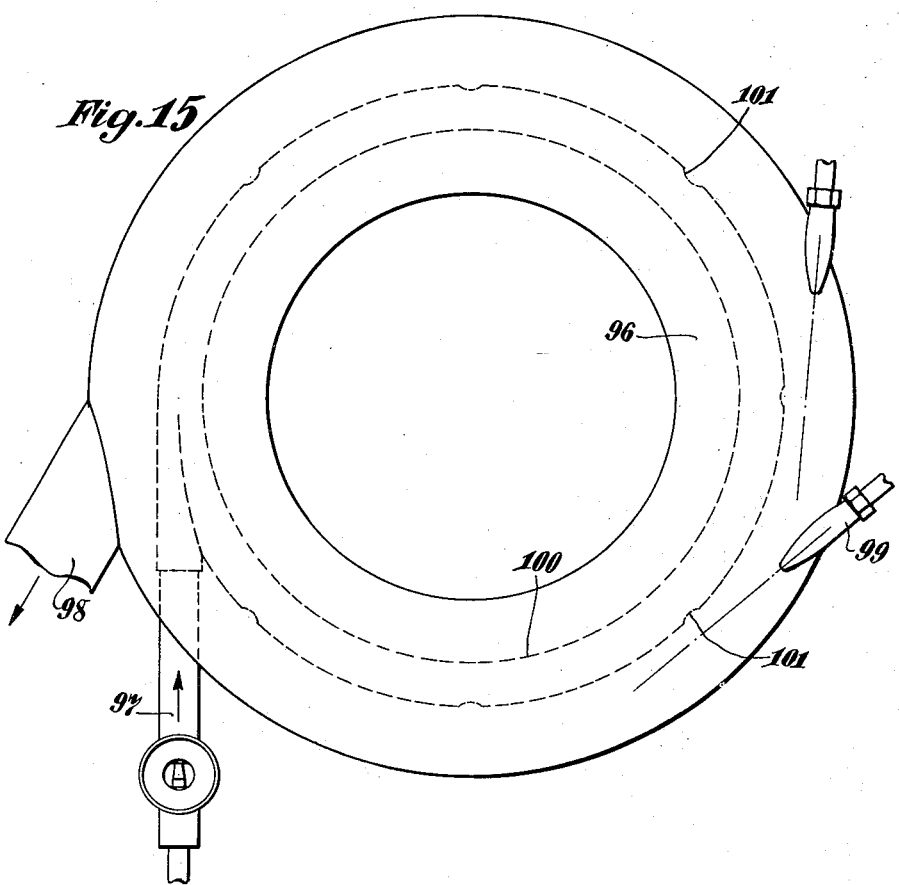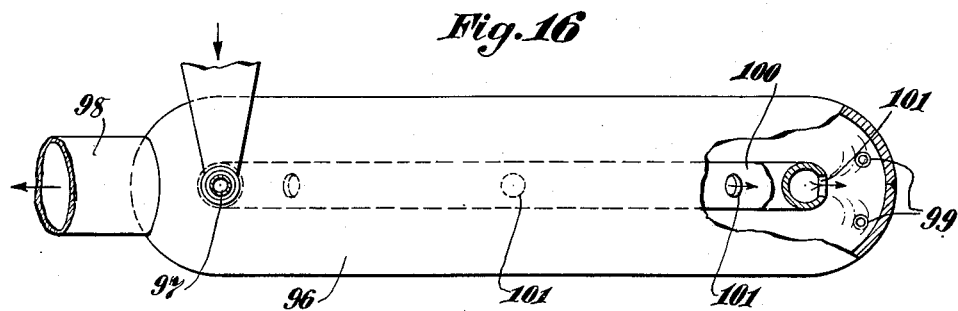

Patented Oct. 22, 1940

2,219,011

UNITED STATES PATENT OFFICE 2,219,011

APPARATUS FOR GRINDING

Cleo Harold Kidwell, Short Hills, and Nicholas N. K. Stephanoff, Roselle, N. J., assignors, by direct and mesne assignments, to Materials Reduction Company, Inc., East Orange, N. J., a corporation of New Jersey Application June 20, 1936, Serial No. 86,426
Renewed November 8, 1938

11 Claims. (Cl. 83—46)

The present invention relates to reducing or grinding materials and embodies, more specifically, an improved method and apparatus therefor wherein the reduction or grinding takes place by the rubbing of the particles to be ground directly together in order that the resulting attrition caused by the rubbing of the particles together may be utilized as the means for effecting the reduction. Devices have heretofore been provided wherein this action has been effected by forming a gaseous vortex in the outer portions of which most of the reducing action takes place. The central portion of the vortex is the region where the gas and the sufficiently reduced particles are removed from the device, suitable separating and collecting operations being effected to recover the reduced substance. These existing devices are effective in reducing substances but nevertheless present difficulties under certain operating conditions.

In accordance with the present invention, it is proposed to provide a method and apparatus for reducing substances in an improved and more efficient fashion and which is superior in operation to existing forms of devices. The invention utilizes the broadly old principle of causing the particles of a substance to collide or be rubbed together in order to reduce the particle size, but provides a distinctly new method of producing a desired attrition and collision of the particles and of maintaining them in suspension and feeding etc., and so controlling their motion as to confine the particles to a grinding zone or operation until sufficiently reduced. More particularly, the invention utilizes the motion of a fluid for entraining and conveying the material to be reduced through a grinding chamber in which the reduction by attrition takes place and which has the physical characteristics of a tube or pipe provided with at least one curved or bent portion into which the fluid is introduced and flows at a velocity which is greater than the velocity at which the resistance to flow in the curved tube becomes measurably greater than the resistance to flow in a similar straight tube and which is not greater than critical velocity for the fluid. Throughout the specification and claims the term "tube" and "pipe" are used interchangeably and are understood to have the same meaning. An exact circular cross-section is, however, not essential in the apparatus by means of which the invention is practiced, and these terms are not to be understood as requiring a circular cross-section.

Inasmuch as there is friction between the walls of the tube or chamber and the fluid directed therethrough, the fluid adjacent the walls will tend to be retarded and flow more slowly than the fluid which is spaced from the walls. Within the curved or bent portion of the tube, the entering single stream of particle-entraining fluid divides into two substantially helical streams, each advancing on the corresponding side of a center section generally defined by a line passing substantially through the center of curvature of the bend or curve of the tube and the center of area of the cross-section of the tube, thus dividing the cross-section of the tube into two substantially equal areas. The direction of the helical flow of one stream is opposite to that of the other, i. e., one of them is clockwise and the other is counter-clockwise, so that for a typical section across the curved or bent portion of the tube, the projected paths of flow are outward along the tube wall in opposite directions at the end of the central section, which is more remote from the center of bend or curvature of the tube, and inward at the other end thereof nearer the center of bend or curvature of the tube.

The force of linear momentum of the material and the force of the outward fluid flow adjacent the central section tend to carry the particles of material passing through the curved or bent portion of the tube to the outer portion of the curve of the tube. Due to centrifugal force, the heavier and coarser particles tend to travel in such outer position until sufficiently reduced to permit the viscosity of the suspending fluid flowing inwardly along the surfaces of the tube to overcome the centrifugal force and entrain the particles in the moving fluid streams in order that they may be collected. Inasmuch as the heavier particles which are traveling in the outer portion of the curve of the tube on account of centrifugal force are continuously subjected to the attrition and reducing action caused by the rubbing and impact thereagainst of the particles more completely entrained in or affected by the fluid streams, these coarser particles are effectively reduced.

An object of the invention, accordingly, is to provide an improved reducing mechanism by means of which reducing operations may be effectively carried out.

A further object of the invention is to provide an improved reducing mechanism wherein the material to be reduced is supplied to one or more reducing nozzles by one or more forces such as gravity, centrifugal force, and characteristic fluid flow above mentioned, and subjected, while in such zone, to attrition by particles of the material moving in the suspending fluid.

A further object of the invention is to provide a device of the above character wherein the flow of a fluid in a curved direction is utilized to produce reducing operations.

A further object of the invention is to provide a device of the above character wherein the flow of a fluid in a curved direction and along a curved surface is utilized to effect a reducing operation.

A further object of the invention is to provide a device of the above character wherein the flow of a fluid in a curved direction and as the result of frictional action of the fluid upon a confining surface is utilized to perform a reducing operation.

Further objects of the invention will be apparent as it is described in greater detail in connection with the accompanying drawings, wherein Figure 1 is a view of one form of the device in which the present invention has been embodied;

Figure 2 is a view in section, taken on line 2—2 of Figure 1, and looking in the direction of the arrows;

Figure 3 is a view showing a further modified form of the invention wherein a reversed curved section is added to the curved section of Figure 1;

Figure 4 is a view similar to Figure 3 showing a modified construction wherein the reversed curved section lies in a different plane from the plane of the first section;

Figure 5 is a side view of the device shown in Figure 4;

Figure 6 is a view in front elevation showing a further modified form of the invention wherein the structure assumes an oval or similar form;

Figure 7 is a view in side elevation, showing the construction of Figure 6;

Figure 8 is a further modified form of the invention wherein an annular ring is provided;

Figure 9 is a view in side elevation of the device shown in Figure 8;

Figure 10 is a further modification wherein the device has a spiral form;

Figure 15 is another modification in which the material is fed through a ring within the circular grinding device;

Figure 16 is a side view thereof, with a portion broken away to illustrate its construction;

Figure 17:
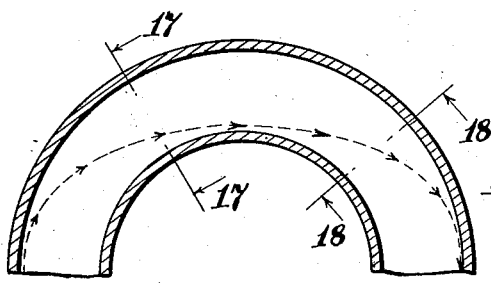
Figure 17 illustrates diagrammatically the path of movement of a particle through a curved portion of the grinding chamber or tube.
Figure 19:
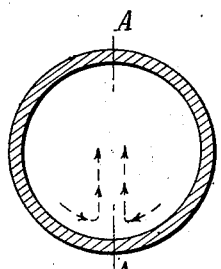
Figure 20:
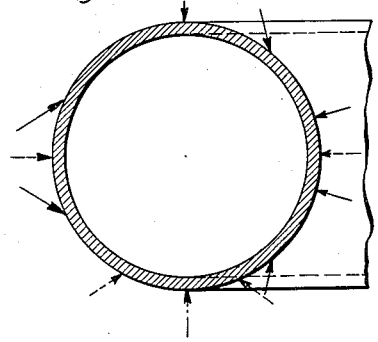

Figure 19 is another cross-section through the tube as seen along the line 18—18 of Figure 17 and illustrates diagrammatically the projected paths described by two particles from the section line 17—17 to the section line 18—18; and Figure 20 illustrates by arrows, the angles and positions at which the fluid may be introduced into a typical section of the tubular grinding chamber.

Before proceeding with the description of the embodiments of the invention illustrated in the drawings the aforementioned principle under which the invention functions will be described in greater detail. When a single stream of fluid flows through a straight tube above the critical velocity for that stright tube, the flow will be turbulent. If the velocity is below the critical velocity, the flow will be stream-line and there will be a definite resistance to the flow, depending upon the characteristics of the tube and the fluid. If the single stream of fluid then enters a curved or bent portion of the tube, the resistance to the flow will increase if the velocity is above a predetermined value, depending upon the radius of curvature of the tube and other factors. For extremely low values of the Reynolds number, the resistance to flow in the straight and curved portions is practically the same, but, as the velocity increases, a point is reached at which the resistance to flow in the curved section is measurably greater than that in the straight section. Above this point, and until critical velocity for the fluid is reached, as the velocity is increased, this difference in resistance to flow will increase and the existence of this increase of resistance to flow in the curved section has been attributed to the fact that, above this point, a double inverse substantially helical flow takes place which results in greater motion of the fluid and, therefore, a greater resistance to flow. This condition exists, above the aforementioned point, until the velocity exceeds the critical velocity for the fluid. "Critical velocity" means that average linear velocity above which a given fluid at a given temperature and pressure will move in turbulent flow and below which velocity the flow is stream-line or viscous.

As the radius of curvature increases, the point at which this resistance to flow in the curved portion begins to increase measurably over that in the straight portion occurs at progressively lower Reynolds numbers and, conversely, as the radius of curvature decreases, this point occurs at progressively higher Reynolds numbers. Moreover, the shorter the radius of curvature, the less distance will the fluid have to travel in the curved portion until the single stream will be divided into two double-inverse, substantially helical streams.

According to Dean in Volume 5, Series 7 (1928) of the Philosophical Magazine, the two principal causes for the formation of the two double-inverse, substantially helical streams in the curved or bent tube are the centrifugal force established in the tube bend or curve (tendency of the fluid on account of inertia to flow chordally in a direction tangential to the curve), and the friction developed between the moving fluid and the tube walls, giving higher velocities near the center of the tube than near the tube walls. Thus, in the curved or bent portion of the tube, the fluid is continually oscillating between the center part of the tube, where the velocity is high, and the boundary or wall surface of the tube, where the velocity is lower because of impedance by friction.

This double-inverse, substantially helical flow of fluid in a curved or bent tube is utilized in the present invention to entrain and convey materials in such a way that the particles are materially reduced in size by attrition and collision and, to utilize this effect, it is desirable to maintain the velocity in a portion of the curved or bent tube far enough above the point at which the double-inverse flow begins to take place to result in effective attrition.

Figure 14:
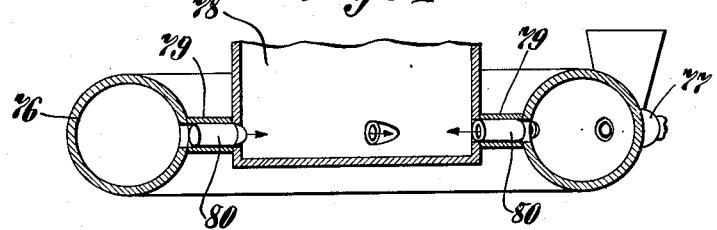
Figure 14 is a cross-section therethrough as seen along line 13—13 of Figure 13.

One embodiment of the apparatus in which the foregoing principle is utilized is illustrated in Figures 1 and 2, in which a U-shaped tube 30, of circular or otherwise shaped cross-section, is provided with end flanges 31 and 32, to which are respectively secured an axially-disposed inlet conduit 36 and an outlet pipe 33. The material-entraining fluid, such as air or other gas or fluid, by means of which the material to be reduced is conveyed in the tubular mill 30, and by which some reduction is effected, may be introduced under pressure through the inlet conduit 36 within which a convergent-divergent nozzle 37 is provided. The fluid is directed to the nozzle by a suitable supply pipe 38, and, in order that material to be reduced may be introduced into the fluid stream more effectively, an injector effect may be provided by means of a nozzle 39 which is provided in a chamber 40, formed in the conduit 36, and immediately in front of the nozzle 37. A hopper 41 communicates with the chamber 40 and thus supplies material to the jet issuing from the nozzle 39, entraining the material therein and directing it into the nozzle 37. The material, together with the fluid entraining the same, is thus directed into the tube 30, at a pressure greater than that in the tube 30, wherein it flows through and about the tube 30 under the flow conditions outlined above. Additional fluid, by means of which the proper velocity may be imparted to the material and greater degree of reduction thereof effected, may be introduced through the supplementary nozzles 34 and 35, positioned with their axes intersecting, as shown in Figure 1, or single nozzles, as indicated in Figures 14 and 15. The supplementary nozzles may be arranged at various angles as indicated by the arrows in Figure 19, depending upon requirements, and may be of the convergent-divergent type as illustrated in Figure 1, or any of the other well-known forms of nozzles, such as the abrupt or flow types, and the like.

Figure 18:
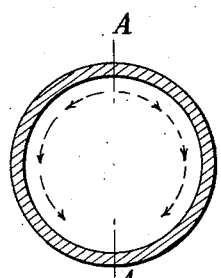
Figure 18 is a cross-section through the tube as seen along line 17—17 of Figure 17 and illustrates diagrammatically the projected paths described by two particles from the beginning of the tube curve to the section line 17—17.

The characteristic double-inverse, substantially helical flow in the tube 30 is illustrated graphically in Figures 17, 18 and 29, Figure 17 representing an axial cross-section through a typical curved or bent tube, such as tube 30 in Figure 1, and having indicated thereon, by means of the successive dotted arrows, the approximate double-inverse, substantially helical path of movement of a particle. Figure 18 illustrates by the series of dotted arrow the projection of the approximate paths of two particles on opposite sides of the central section A—A, from the beginning of the tube curve or bend to the section line 17—17, while Figure 19 illustrates the projection of the approximate paths of these particles from the section line 17—17 to section line 18—18.

Inasmuch as the resistance to the outward flow of the fluid at the top of the tube as seen in Figs. 18 and 19 is less than at the bottom, the general direction of flow will be counterclockwise in the left hand section of the tube, as indicated by the arrows. Since the heavier and less reduced particles will be influenced to a greater extent by centrifugal force than the smaller particles, the heavier particles will travel at the bottom of the tube and outwardly thereof, adjacent the outer tube wall. As the particles are reduced and the ratio of the area thereof to the volume is increased, they will gradually become more subject to the action of the fluid by reason of its viscosity. When the particle size is sufficiently reduced, these reduced particles will be entrained in the fluid, gradually being carried off with the fluid which discharges from the tube 30. In this fashion, reduction of the particles is accomplished by attrition, impact, and shear resulting from the action caused by the introduction of the fluid through the nozzles 34, 35 and 37.

If desired, the nozzles 34 and 35 may be inclined with respect to a transverse plane passing through the tube in such fashion as either to retard or increase the effect of the fluid flow about the tube. It will generally be desirable to have the total effect of the nozzles 34, 35 and 37 in increasing or assisting fluid flow about the tube to be greater than the total effect of such of the nozzles 34, 35 and 37 in opposing this flow. Moreover, the angularity of the nozzles 34, 35 and 37 may be changed in certain of the nozzles to enhance the double inverse flow effect or to decrease the double inverse flow effect to the point of turbulence to take place where desired about the channel.

In the construction shown in Figure 3, an additional curved section 42 is connected to the section 30 and the outlet conduit 43 is secured to the outlet end of this added curved section. In this fashion, the fluid and entrained particles flow in a continuously curved direction but the double inverse flow effect illustrated in Figures 18 and 19 will be reversed in the section 42 from the corresponding effect in the section 30. At the connection 44, therefore, between the sections 42 and 30, this reversal of the double inverse flow effect takes place, and, at some point in the entering end of the section 42, there does not exist the condition illustrated in Figures 18 and 19.

In the construction shown in Figures 4 and 5, the section 42 of Figure 3 has been turned through 90 degrees and lies in a plane at right angles to the plane of section 30. This formation may be utilized in such fashion as to produce a desired flow effect in the pipe sections as will be readily apparent.

In Figures 6 and 7 there is illustrated a further modification of the invention wherein the reducing device assumes an elliptical or similar form and may consist of a straight diverging entrance tube 45 which may be supplied with a fluid and material to be reduced through a conduit 46, similar to the corresponding element in the construction shown in Figures 1 and 3. The straight portion 45 communicates with a curved end section 47 which, in turn, is connected with a straight section 48 and a semi-circular section 49. Section 49 communicates with the straight section 45 by means of a straight section 50. The fluid and reduced particles are exhausted through an outlet pipe 51 which may communicate with a suitable collecting device.

Several pairs of secondary fluid nozzles 52, 53, 54 and 55, similar in construction and function to nozzles 34 and 35 of Figure 1, are preferably introduced in the lower curved section 47 of the construction of Figures 5 and 6. Additional fluid, by means of which increased velocity may be imparted to the particles of material and greater reduction accomplished, may be introduced through these secondary fluid nozzles 52, 53, 54 and 55. In this construction, the large particles may remain in the device and, if desired, be caused to circulate about the device until sufficiently reduced. In such event, the large particles flowing from the straight section 50 into the entering straight section 45 are directed into the rapidly moving stream through the section 45 and an effective reducing action takes place.

Inasmuch as the device is arranged vertically, which is the preferred arrangement of all forms of the invention, the larger particles, or the particles not sufficiently reduced, will fail to be carried upwardly through the straight section 48 and will thus have a tendency to remain in the bottom curved section 47. This structure also provides an initial classification which, as mentioned above, may be supplemented by the classification afforded by the construction adjacent the discharge outlet 51 wherein the larger particles passing downwardly through the straight section 50 will pass beyond the outlet 51 and be returned into the straight section 45. Moreover, it is preferred that the secondary or supplementary nozzles 52, 53, 54, 55 and 56 be so oriented that adjacent pairs either on the same or upon opposite sides of the curved section 47 will be positioned in such fashion that their axes intersect to provide a further grinding effect, as centrifugal force and previously noted. Inasmuch as the characteristic flow of the material and fluid through the curved section 47 as well as the action of gravity, will cause the heavier particles to be carried to the bottom of the curved section, this section will effectively feed the substance into the nozzles 52, 53, 54 and 55 and cause the material to be entrained in the fluid flow from such nozzles, thus resulting in effective reduction of such particles. Moreover, inasmuch as these heavier particles will predominate at the bottom of the curved section 47, and inasmuch as the proportion of unreduced particles to volume of fluid is greater at the bottom of the curved section 47 than at other parts of the chamber, the quantity of particles made available to the activating nozzles is increased, thus increasing grinding efficiency. A further force exerted in the curved section 47 is that resulting from the down sweep of material from the intake 45 as well as the down sweep of material which is recirculated from the straight section 50. As a result, the nozzles 52, 53, 54 and 55 are supplied with an adequate amount of raw material. One or more exhaust tubes 51 may be provided, as illustrated in Figures 6 and 7.

In the construction shown in Figures 8 and 9, the invention has been embodied in an annular ring formation or torus wherein the material is introduced by means of a device 57, which may be similar to the corresponding element of the constructions above described, and which is preferably angularly disposed with respect to an annular ring 58. This ring may be formed of two similar sections and provided with an outlet duct or member 59 through which reduced material and the entraining fluid may be discharged. Secondary nozzles 60 may be suitably disposed as previously described in connection with the invention.

In the construction shown in Figure 10, the reducing mechanism consists of a plurality of sections forming a spiral chamber, the sections of which may be of increasing diameters. The first section of the mechanism is shown at 61, receiving material through an inlet nozzle 62 and being provided with secondary nozzles 63. The second section is shown at 64 and is provided with a plurality of secondary nozzles 65, a bleed passage 66 being provided to return insufficiently reduced particles to the entrance portion of the section 61. A third section 67 may be provided to receive material from the section 64. The material and entraining fluid may be received from the section 67 and discharged through a further section 69, having an outlet 70.

Figure 11:
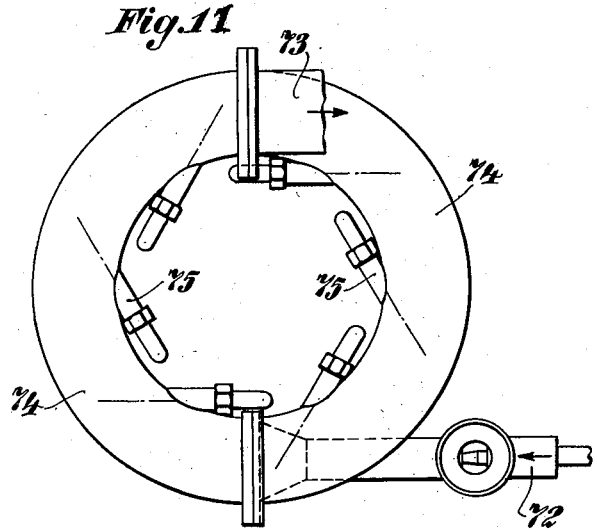
Figure 11 is a further modification wherein the device has a helical form.
Figure 12:
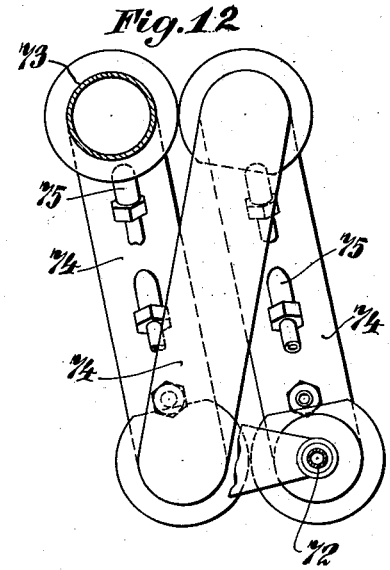
Figure 12 is a side view thereof.

In the construction shown in Figures 11 and 12 the reducing mechanism is shown in the form of a helix, one end of which is provided with a nozzle 72 through which material may be introduced into the device and the other end of which is provided with an outlet 73. Between the nozzle 72 and outlet 73 a plurality of similar curved sections 74 are provided to form the helix, the first turn or section of which preferably being provided with secondary nozzles 75.

Figure 13:
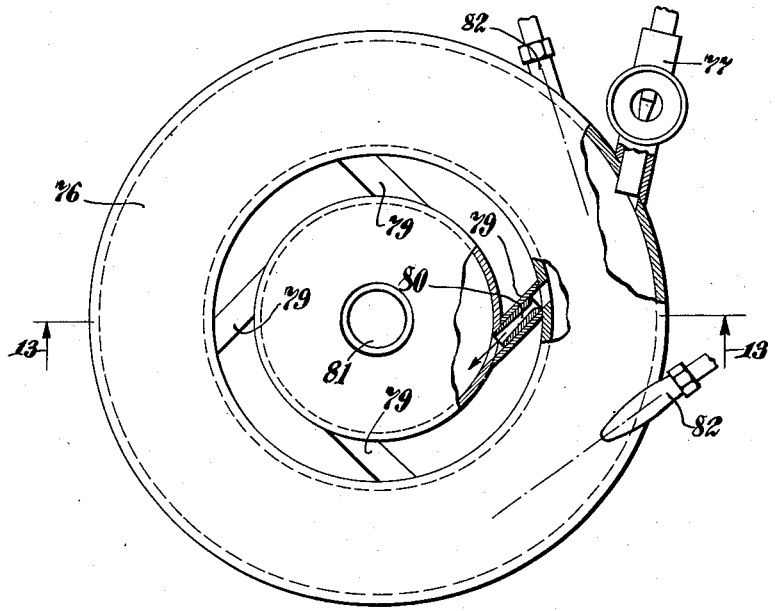
Figure 13 is a two-stage form of the device, one of which stages utilizes the present invention.

In the construction shown in Figures 13 and 14, a multi-stage effect is produced by means of an outer circular chamber 76 or toroid having a material and fluid inlet 77. A central chamber 78 communicates with the outer chamber 76 through passages 79 which are preferably eccentrically arranged and provided with nozzles 80. Secondary nozzles 82 may be provided about the outer chamber 76, as previously described. After the reducing action has taken place in the outer chamber, the material is directed into the inner chamber 78 through the convergent-divergent nozzles 80 where a further reducing action may be effected, the material discharging with the fluid through an outlet 81.

In the construction shown in Figures 15 and 16, an annular chamber 96 is provided with suitable feed mechanism 97 and an outlet 98, together with supplementary nozzles 99 by means of which a desired fluid motion within the chamber may be preserved. The supply pipe 97 communicates with an annular feed pipe 100 having a series of apertures or nozzles 101 by means of which the material may be introduced into the chamber 96. The position and number of the nozzles 99 may be such as to cause the paths of fluid issuing therefrom to intersect, and also may be such as to cause such paths to intersect the material which is discharged from the outlets or nozzles 101 in the feed ring 100.

It will thus be seen that the present invention provides an effective grinding or reducing mechanism wherein characteristic double inverse flow effect of fluids flowing through a curved channel or flowing through and along a member having a curved surface is utilized to effect reduction of material entrained in such flow. Moreover, the invention, by introducing the material into the grinding chamber by means of one or more nozzles, provides a further effective factor in reducing the material, the reduction being further enhanced by utilizing this last named factor in combination with the double inverse flow effect above referred to in such fashion as to enable the material to be fed effectively to the nozzles. The effect herein above described may be enhanced by attrition of the material at the point where the two paths of fluid and material converge. This would necessarily be in the central plane of the device and adjacent the inner periphery of the tube or tunnel. Obviously, the particular type and number of nozzles, as well as the particular formation of grinding chamber, is immaterial so long as they embody one or more of the above factors, and the invention is not to be limited save as defined in the appended claims.

We claim:

1. In apparatus for reducing material, the combination of an endless elongated pipe having continuous walls throughout the major portion of its extent disposed about a curved axis in the direction of its length and forming at least one curved portion, said walls all being spaced from the center of curvature of the pipe and including a wall on the side of the curved pipe nearest the center of curvature thereof cooperating with the other walls to divide fluid flowing through the pipe into a pair of adjacent, substantially helical streams advancing in the same general direction through the said curved portion of the pipe, said pipe having opposite curved portions curved in the direction of their lengths and connected by substantially straight portions to form a closed circuit of substantially oval shape, means supporting said pipe in a substantially upright position with one of the curved portions thereof at the bottom, means for introducing the material to be reduced into said pipe, means for introducing a fluid under pressure into said pipe for entraining and conveying the material upwardly from said curved bottom portion toward and through the upper curved portion of the pipe, discharge means leading from the pipe at a point adjacent the end of said upper curved portion remote in the direction of fluid flow from said means for introducing material for continuously removing reduced material from the pipe and additional means for introducing fluid under pressure to the bottom curved portion of said pipe.

2. In apparatus for reducing material, the combination of an elongated pipe having continuous walls throughout the major portion of its extent disposed about a curved axis in the direction of its length and forming at least one curved portion, said walls all being spaced from the center of curvature of the pipe and including a wall on the side of the curved pipe nearest the center of curvature thereof cooperating with the other walls to divide fluid flowing through the pipe into a pair of adjacent, substantially helical streams advancing in the same general direction through the said curved portion of the pipe, means for feeding the material to be reduced into said pipe, means for supplying a fluid under pressure into said pipe for entraining and conveying the material into the said curved portion of the pipe, whereby the material is reduced by attrition, and a return by-pass communicating at one of its ends with the pipe at a point adjacent to said means for supplying fluid and communicating at its other end with said curved portion at a point remote in the direction of flow therein from said means for supplying fluid, whereby at least a portion of the fluid and material is returned to the pipe for further reduction, and means communicating with said pipe beyond the said other end of said by-pass in the direction of flow therein for removing fluid and material therefrom.

3. In apparatus for reducing material, the combination of a tube of substantially circular cross-section having a substantially smooth inner surface, continuous walls throughout the major portion of its extent and at least one longitudinally curved portion and a total curvature of at least 180°, means for introducing material to be reduced into said tube, primary means to introduce fluid into said tube to convey said material along said tube, and a plurality of secondary means disposed along the periphery of said curved portion for introducing fluid into said tube, said primary and secondary means being constructed and arranged to cause said fluid to divide into and be maintained as two oppositely flowing substantially helical streams advancing along said curved portion.

4. The device set forth in claim 3 in which the tube includes a pair of curved portions connected by a pair of straight portions forming substantially an oval.

5. The device set forth in claim 3 in which the tube is formed as a spiral having at least one complete convolution.

6. The device set forth in claim 3 in which the tube is of annular shape.

7. In apparatus for reducing material, the combination of a tube of substantially circular cross-section having continuous walls throughout the major portion of its extent, a substantially smooth inner surface, at least one longitudinally curved portion and a total curvature of at least 180°, means for introducing material to be reduced into said tube, primary means for introducing fluid into said tube to convey said material along said tube, a plurality of secondary nozzles disposed along the outer periphery and along the lateral sides of said curved portion, said primary means and secondary nozzles being constructed and arranged to introduce fluid at such velocities and volumes and in such directions that their collective effect causes said fluid upon entry of said curved portion to divide into two oppositely flowing substantially helical streams advancing along said curved portion, and means for withdrawing the material from said tube.

8. In an apparatus for reducing material, the combination of a tube of substantially circular cross-section having continuous walls throughout the major portion of its extent, and a substantially smooth inner surface, at least two curved portions connected by substantially straight portions, means for introducing material to be reduced into said tube, primary means for introducing fluid into said tube to convey said material along said pipe, a plurality of secondary nozzles disposed along the lateral sides of at least one of said curved portions for introducing secondary fluid into said tube, said primary means and said secondary nozzles being constructed and arranged to cause said fluid upon entry into said curved portions to divide into and be maintained as two oppositely flowing substantially helical streams advancing therealong, and means disposed adjacent the end of the curved portion most remote from said primary means for withdrawing material from said tube.

9. In apparatus for reducing material, the combination of an elongated tubular member of substantially circular cross-section having continuous walls throughout the major portion of its extent, a substantially smooth inner surface, at least one longitudinally curved portion and a total curvature of at least 180°, means for introducing material to be reduced into said member, means for introducing primary fluid into said tube at a sufficient velocity to convey said material along said tube to cause said fluid to divide upon entry of said curved portion into two oppositely flowing helical streams, and a plurality of pairs of nozzles disposed along the lateral sides of said curved portion for introducing fluid toward the inner side of the curved portion and substantially in the direction of flow of said streams adjacent said lateral sides to maintain the flow of said fluid in said substantially helical streams and means for withdrawing the material from said tube.

10. In apparatus for reducing material, the combination of a substantially toroidal tube of substantially circular cross-section having continuous walls throughout the major portion of its extent, and a substantially smooth inner surface, means for introducing material to be reduced into said tube, primary means for introducing fluid into said tube at a velocity sufficient to convey said material along said tube and to cause said fluid to divide into two oppositely flowing substantially helical streams advancing along said tube, a circular chamber disposed substantially concentrically with and encircled by said toroidal tube, a plurality of peripherally disposed spaced apart tubular elements of relatively small cross-section, connecting the interior of said tube with the interior of said circular chamber for withdrawing the more finely divided material and the fluid from said toroidal tube into said chamber for further reduction of the material therein, and means for withdrawing the reduced material from said chamber.

11. The device set forth in claim 10 in which said tubular elements are inclined in the direction of flow of the fluid along said tube.

CLEO HAROLD KIDWELL.
NICHOLAS N. K. STEPHANOFF.

CERTIFICATE OF CORRECTION.

Patent No. 2,219,011.   October 22, 1940.

CLEO HAROLD KIDWELL, ET AL.

It is hereby certified that error appears in the printed specification of the above numbered patent requiring correction as follows: Page 3, first column, line 47, for the numeral "29" read --19--; page 4, first column, lines 23 and 24, strike out "centrifugal force and" and insert the same after "as" in line 24; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.